Nov. 1, 1949.  N. B. ARMSTRONG  2,486,512
METHOD AND APPARATUS FOR PROMOTING
THE GROWTH OF VEGETATION

Filed June 8, 1945  3 Sheets-Sheet 1

INVENTOR.
Nelson B Armstrong

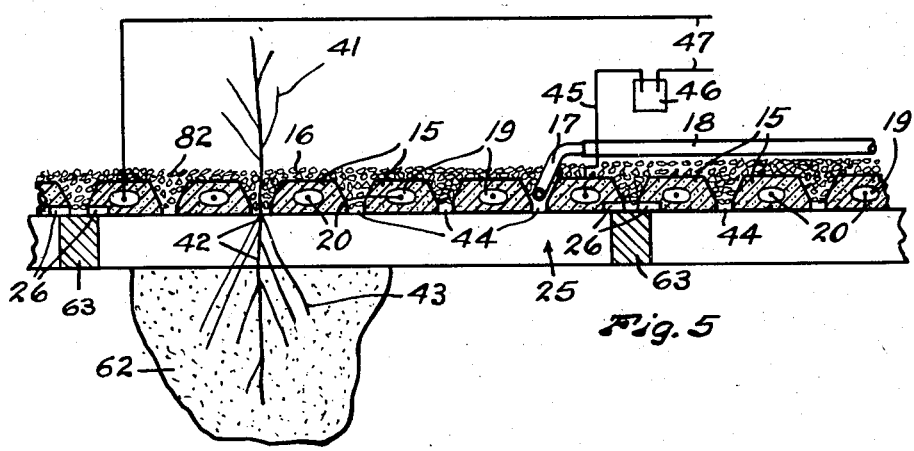
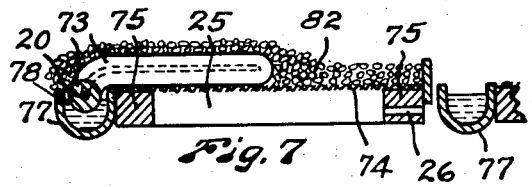
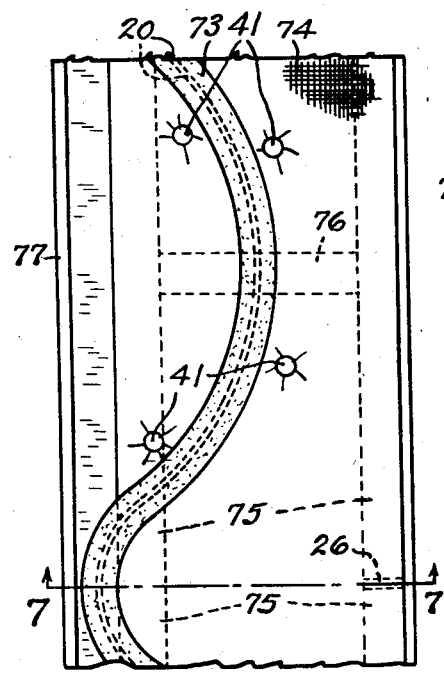
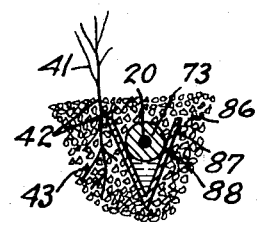

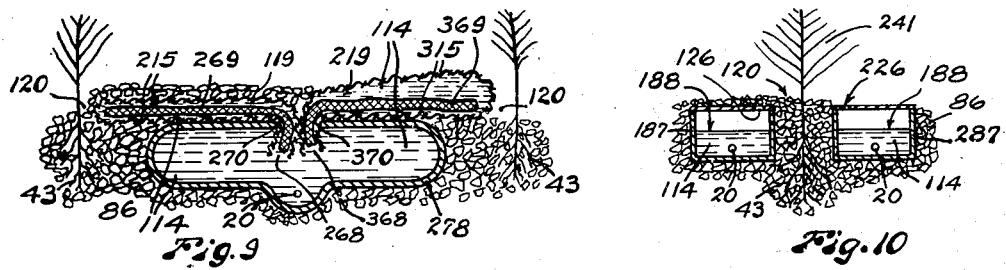

Patented Nov. 1, 1949

2,486,512

UNITED STATES PATENT OFFICE 2,486,512

METHOD AND APPARATUS FOR PROMOTING THE GROWTH OF VEGETATION

Nelson B. Armstrong, Seattle, Wash.

Application June 8, 1945, Serial No. 598,279

22 Claims. (Cl. 47—1.2)

1

This invention relates to plant husbandry wherein growing conditions are studied and controlled for the purpose of producing biologically superior plants.

This application is in the nature of a continuation in part of my co-pending patent application (now abandoned) Serial Number 409,373, filed September 3, 1941 for "Method and apparatus for promoting the growth of vegetation."

An object of this invention is to provide means for and a method of continuously supplying moisture to a plant at a location within the plant nutrient medium near the surface of said nutrient medium and above the main concentration of the feeder roots of the plant.

Another object is to provide a method for and a means of overcoming the objectionable concentration of nutrient salts at the surface of a nutrient medium attendant, in the past, upon the use of a continuous underground water supply, and to overcome this objection while using a continuously replenished supply of liquid communicated to the plant nutrient medium at a location beneath the surface of said nutrient.

Another object is to provide a means for and a method of providing and maintaining above the plant nutrient and below the foliage of the plant and preferably at the approximate location of the root crown of the plant, a blanket or layer of warm moist air having a source of moisture independent of the liquid in the plant nutrient solution.

Another object is to provide and maintain at all times a sufficient supply of moisture from said independent liquid to prevent either artificial heat or natural sunshine from drying out the root crown of the plant.

Another object is to prevent net evaporation of moisture from a plant nutrient by blanketing said nutrient with moisture from a source independent of the liquid in said nutrient, thereby preventing a change in the concentration of said plant nutrient.

Another object is to protect the foliage of the plant from drying out due to a rise in temperature without obstructing the sunlight falling upon the plant, by supplying to said foliage moisture in warm vaporized form originating in a constant stream from beneath the foliage.

Another object is to make available to different roots of a plant growing under the controlled conditions hereinbefore mentioned, various different plant nutrients whereby the plant is caused to exercise its own volition in selecting the various nutrients made available.

2

Another object is to make highly accurate measurements of the respective quantities of those various components of the plant nutrient which the plant has been caused to volitionally select, under the conditions described in the preceding paragraph. A further object is to make said measurements while any factor influencing or thought to influence plant growth is added, varied or omitted.

Another object of this invention is to influence the assimilation of certain chemical elements by plants through a control of the temperature of the root crown of the plant, while said root crown is blanketed by a continuous supply of the independent moisture hereinbefore mentioned, thereby making it possible, for example, to increase nitrogen assimilation during growing periods by raising the temperature or to increase assimilation of elements inhibited by high nitrogen uptake such as potassium during fruiting periods by lowering the temperature.

Another object is to provide a method of and means for successfully feeding to plants different ingredients of a plant nutrient which are subject to undesirable chemical reaction if allowed to mix before entering the plant roots.

Another object is to provide a method of and means for successfully feeding to plants different ingredients of a plant nutrient which are subject to undesirable chemical reactions if they are mixed and allowed to stand a substantial period of time before they are taken up by the plant roots.

Another object is to provide means for continuously maintaining the proper proportion of of chemical elements relative to each other in a plant nutrient solution despite the fact that plants feeding from said nutrient solution take up unequal quantities of the different chemical elements in the said solution.

Another object is to prevent net evaporation from the plant nutrient solution; and to provide at all times enough humidity to the foliage of the plant to permit the stomata to freely open without endangering the mesophyl cells, so that erratic transpiration will thereby be controlled to the end that the plant can be studied under these conditions for the purpose of determining its nutrient requirements so that similar plants can subsequently be correctly fed without necessitating the usual frequent chemical analysis of the nutrient and the usual periodic addition of elements to the nutrient.

Another object is to provide continuously the appropriate quantity of moisture automatically adjusted to and automatically maintained in ratio with, each rise in temperature both of the air and of the root crown, and whether the temperature change originates from solar radiation or artificial heat, and to accomplish this without drawing upon the moisture in the nutrient solution.

Another object is to bring about the root crown and foliage conditions set forth in the preceding paragraph and at the same time to properly synchronize the above mentioned varying quantities of moisture to the foliage and to the root crown with the concentration of chemical elements in the nutrient solution. In the absence of synchronization of these moisture and heat factors, plants may die for lack of water with their roots in an aqueous solution.

Another object of this invention is to provide a porous body adapted to be positioned adjacent the root crown of a plant and having a source of moisture independent of the liquid in the plant nutrient, said porous body being capable when heated of giving off warm moist vapor to blanket the plant and the plant nutrient.

Another object is to provide a method and novel devices whereby academic formulae for the production of biologically superior plants may be successfully utilized to produce biologically superior plants by persons not skilled in the art.

In carrying out my invention I utilize solar radiation, artificial radiation or both. When solar radiation of sufficient intensity is available and is used, another object of this invention is to cause solar heat to synchronize the following train of events: by means of this invention, solar heat by thermostat cuts out artificial at a selected level; and automatically calls forth, from a source independent of the liquid in the plant nutrient solution, a quantity of moisture for providing humidity to the foliage and a quantity of moisture for providing humidity to the root crown which quantities are, by means of this invention, automatically determined by the number of calories of solar heat effective, thereby accomplishing appropriate relative humidity to the root crown and foliage for each level of solar heat; and at the same time said humidities are kept properly synchronized with the ratio of total chemicals to water in the nutrient or in the soil solution; and further, by means of this invention, each chemical element is continuously maintained at a selected level and in desired ratio to the other chemical elements; and to moisture in the nutrient; and to humidity of the foliage and root crown for each level of solar heat; and also this invention makes possible the continuous automatic synchronization of all essential objects related in this specification to the end of maintaining automatically a low threshold of photosynthesis in such manner that academic investigators may hold plants in a selected, automatically synchronized environment for the separate study of the impact of each factor of optimum growth in order that said academic investigators can stipulate, for the subsequent feeding of a similar plant, novel nutrient formulae such as formulae specially designed for readily duplicated schedules of the above mentioned automatically synchronized environment for the purpose of enabling an unskilled operator to subsequently produce a biologically superior plant.

In the absence of solar radiation of sufficient intensity another object of this invention is to provide a method of and devices for causing the lowered temperature of reduced solar radiation or of artificial light to call forth and synchronize to each other each factor in the following train of events: The thermostat cuts in a selected intensity of artificial heat. Said artificial heat, by means of this invention, determines the quantity of moisture for the plant foliage and for the root crown, which is drawn from a continuously available supply of moisture from a source independent of the moisture in the nutrient or in the soil solution, thereby providing a relative humidity, in step with each level of heat effective, to the foliage and to the root crown; and simultaneously protecting from net evaporation the optimum moisture concentration in a nutrient solution; wherein each chemical element is automatically maintained at a constant level and in a constant ratio to each of the other chemicals contained therein; and in step with the unequal amounts of said chemicals removed by the plant; to the end that under artificial light or solar radiation of low intensity the train of events attached to this specialized artificial heat will harmonize, as properly as adequate solar radiation impinging upon sufficiently moist soil does harmonize, the heat and moisture environment of the plant; and, at the same time by means of this invention, all essential objects related in this specification to the end of maintaining a low threshold of photosynthesis, are maintained properly in step in such manner that academic investigators can hold a plant in an orderly environment including selection of a rootcrown temperature and humidity condition which may be adapted to inhibit or adapted to increase uptake of selected nutrient elements such as nitrogen; and so that academic investigators may ascertain the impact and optimum level of each factor of desired plant yield under known readily tabulated conditions capable of being duplicated, and so that academic investigators can make stipulations of such as temperature, humidity and nutrient concentration schedules; and stipulations of novel nutrient formulae such as formulae specially designed for influencing the uptake of certain plant nutrient elements; and so that an unskilled operator may subsequently produce biologically superior plants in accordance with said academic stipulations and under conditions including artificial light and reduced solar radiation.

Another object is to provide novel method and apparatus for making available to a plant, by conveyor means, different predetermined nutrients adapted to different stages in the growth of a biologically superior plant.

Another object is to provide novel method and apparatus for making available to a plant by conveyor means different predetermined temperature and humidity environments adapted to different stages in the growth of a biologically superior plant.

In conjunction with my method, I use apparatus such as the following to carry out the object set forth above. Similar parts are designated by similar numbers throughout.

Fig. 5 shows a fragmentary sectional view of an example of apparatus for carrying out soil culture.

Figure 1:
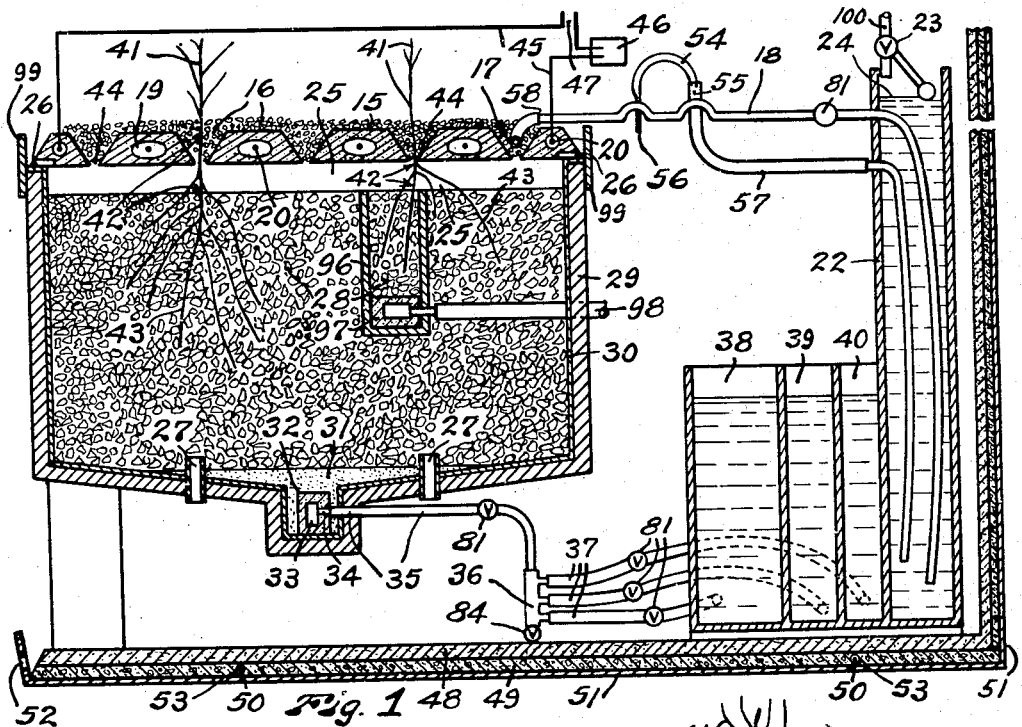
Fig. 1 is a fragmentary sectional view with parts in elevation showing an example of apparatus for carrying out aggregate culture of sand, gravel, "Haydite," pumice or any other suitable non-toxic aggregate. Use of such material is hereafter referred to as aggregate culture.

Fig. 6 is a fragmentary plan view of another example of a litter. This litter uses asbestos or glass or other fibre as the material of high capillary attraction enclosing the heat source. Showing of the aggregate has been omitted. The heat controls are not shown.

Fig. 7 is a sectional view substantially on line 7—7 of Fig. 6, aggregate being shown.

Fig. 8 is a sectional view showing a modified form of litter constructed in accordance with this invention.

Fig. 9 is a cross sectional view showing another modified form of litter constructed in accordance with this invention.

Fig. 10 is a cross sectional view of another apparatus for carrying out the method of this invention.

Figs. 11, 12 and 13 are sectional views showing three types of apparatus for carrying out a method of water culture in accordance with this invention.

Fig. 14 is a sectional view taken on broken line 14—14 of Fig. 15 and showing an apparatus for selectively controlling the feeding of different nutrients to plants.

Fig. 15 is a fragmentary cross sectional view taken substantially on broken line 15—15 of Fig. 14.

Fig. 16 is a cross sectional view taken substantially on broken line 16—16 of Fig. 17 and showing plant growing means of traveling conveyor type.

Fig. 17 is a sectional view of said conveyor type means, taken substantially on broken line 17—17 of Fig. 16, parts being broken away.

Fig. 18 is a cross sectional view of a device for selectively feeding different nutrients to different roots of the same plant.

Fig. 19 is a fragmentary sectional view taken substantially on broken line 19—19 of Fig. 18.

Throughout Figs. 1 to 5—15 shows a top litter (the term "litter" is understood to refer to a porous body means, such as the porous body means herein shown) composed of a material of suitable strength with suitably high capillary attraction such as a ceramic composed of very fine wood flour and clay such as pumice clay. This top litter should preferably have one of two colors: black to convert solar radiation into heat for purposes detailed elsewhere herein, or white to minimize the conversion of solar radiation into heat for other purposes detailed elsewhere herein. Zeolites may be included as a part of the litter.

16 shows another material of high capillary attraction having preferably a black color to better take advantage of solar radiation. This material may be, for example, light-weight "Haydite," well leached pumice, or pulverized fragments of litter 15. Suitable mesh may be secured by screening over such as a one sixteenth inch screen and through a one half inch screen. This material is hereinafter referred to as black aggregate. The term "Haydite" is explained on pages 142 and 143 of "Soilless Culture" by Alex Laurie.

17 shows a connection such as a glass tube sealed to the litter 15 to which 18, a conduit such as a rubber hose, supplies liquid through said connection 17 to 19, an opening inside the litter 15. Said opening contains 20, a heating means which, for example may be gas, steam, hot air, hot water or electric resistance connected through 21, a heat controller or in the case of electricity a thermostat which may in some installations be omitted as for instance where the fluctuations in solar heat are within a narrow bracket.

22 shows a water or liquid container having a liquid level maintained from a source such as water mains by 23, a float valve of the type commonly used for the supply tanks of toilet bowls.

24 shows a level of liquid in container 22. It will be noted that the conduit 18 leaves the liquid container 22 at a point below the level of the liquid. This positioning automatically primes the conduit 18 and pores of the litter 15 positioned below said level 24. Once primed, capillary action takes place and the level 24 of the liquid may then be lowered below the litter 15 because the capillary action in the litter 15 will syphon water up from below its own level. Thus 24 may be on a level with, or above, or below the litter because of capillary power in the litter once it is primed. The float valve and water container may be dispensed with by substituting a litter with pores adjusted in size to prevent loss of free liquid from water under pressure from a source of supply such as ordinary city water mains.

25 shows a barrier to net evaporation loss from the surface of any aggregate, nutrient solution, soil or other similar surface comprising a moisture-laden but oxygen replenished air space, maintained saturated with moisture very close to the dew point for the lowest temperature expected, and securing moisture and heat from a litter and heat source wherein the moisture for the litter is taken from a source independent of liquid from said surface being protected from evaporation.

26 shows openings through which either oxygen may enter or foul air may leave in addition to passing through the black aggregate 16 and in some instances through the white aggregate 82.

27 shows lower openings through which oxygen may enter or foul air may leave and through which standing water such as from heavy rainfall may drain.

28 may be, for example, small chunks of leached pumice passed over one sixteenth inch and through one half inch screen, or it may be similar fragments of the ceramic described above or it may be gravel, light "Haydite," sand, cinders or other suitable material referred to under the general classification of aggregate.

29 shows an example of a container for aggregate constructed of concrete, wood, metal or other suitable material or merely an earthen trench over which in each case, unless already waterproof and non-toxic, is laid 30, a sheet of non-toxic material such as roofing paper.

31 shows a zeolite containing material 325 mesh or finer such as clay, grog, pumice sand or other suitably porous material.

32 shows an example of a lower litter consisting of a material such as my ceramic with preferable sufficient capillary attraction to prevent loss of liquid under a head of as much as 12 inches except as sucked from it by a porous material of 325 mesh or finer. This lower litter will preferably contain zeolites. The use of a heating means in the litter is optional. Once primed this litter is capable of syphoning liquid through a conduit from below its own level.

33 shows a tunnel or open space in the lower litter terminating in 34, a connection means such as a glass tube, to which is attached 35, a conduit leading to 36, which is an example of a mixing chamber for various chemicals in solution, and functioning also as a sediment bulb having 84, a pet cock or draw-off tap for the removal of sediment or precipitates. This pet cock 84 unless of glass must be treated inside with such as asphaltum to make it non-toxic to plants.

37 shows capillary feeder conduits leading to an example of self metering containers such as the series 38, 39, and 40.

38 is a container with cross sectional area proportional to the proper ratio of consumption of the chemical elements in solution contained in it, to chemical elements in other containers, detailed hereafter, for a given species of plant for a given period of time at a given stage of its growth.

39 and 40 are containers each having cross sectional area proportional to the desired consumption by the plant of the chemicals it contains in solution but containing chemicals in solution kept separate from those in other containers until reaching the mixing chamber to prevent the formation of undesirable compounds or precipitates. These containers 38, 39, and 40 being connected to a common main 36 will each maintain the same level at all times during discharge of their contents. Capillarity in the feeder conduits 37 is an example of a device for preventing backing up of liquid due to slight differences in the specific gravity of their various contents. Any number of conduits in addition to the example 35 may be led off from the same mixing chamber 36 to other installations of lower litter, or through a float valve of a type similar to valve 23 to such as a water culture. The cross sectional areas of containers such as 38, 39, and 40 being different will automatically regulate the proportion of solutions supplied to mixing chamber 36 in proportion to these cross sectional areas.

41 shows the foliage of a plant and 42 shows the root crown, which for most plants will be centered in the air space 25 but in the instance of some plants may vary either up or down from this location.

43 shows the feeder roots of the plant.

44 shows an example of slots in the litter cut with a penknife or other tool in a thin web left intact, in the event it is made of ceramic, until after firing in the kiln. These slots are formed with one end open and taper becoming larger toward the open end such that the stem or roots of the plant may easily be passed through them either in setting out plants, or in removal for transplanting, or in removal of plants at the end of their period of usefulness, or in setting around a plant already growing without disturbing its location or any of its roots.

45 shows electric circuit wires connected with the heating elements 20 in the litter means. Obviously the supply of electric current to electric heating elements herein disclosed may be thermostatically controlled if desired.

46 shows a time clock, which in the case of some temperate zone plants, is necessary to turn off the electric heat for a time each night and permit them to cool off.

47 shows wires heading to the main supply of electricity.

48 shows fragments of a porous material used in a greenhouse or other plant growing enclosure for the walls, for the ceiling where glass is not used and for such portions of the floor as do not receive wear. These porous fragments are applied as a surfacing material to 49, a porous concrete-like mixture such as about six parts pumice sand of one hundred mesh or finer to one part Portland cement. Preferably the porous fragments 48 are applied while the concrete mixture 49 is still green.

50 shows a heat source such as a rubber soil heating cable. Other heating means may be substituted or added.

51 shows waterproofing behind 49. Material such as a layer of roofing paper, with the joints sealed, is suitable.

52 shows a drain leading excess moisture to the sewer or other run-off.

53 shows a porous conduit for conducting liquid to the capillary pores of 48 and 49.

Construction such as 48, 49, 50, 51, and 53 may be put to other uses such as outdoors with such as black aggregate in place of 48, and preferably set at an angle perpendicular to the incident rays of the sun at noon for that latitude, to the end that a most efficient utilization of the heat of solar radiation may be concentrated on the production of increments of moisture for the air about plant foliage. Said construction is herein referred to as a slope.

54 shows a compartment into which liquid rises through 55, a tapered opening.

56 shows the tip of a capillary tube in which 54 terminates and through which liquid drips or flows from 57, a column of liquid, preferably in a flexible conduit.

Capillary attraction resists the loss of liquid from the capillary section of the tube at 56, and resists the loss of liquid with greater or lesser pull as point 56 is varied in relative elevation with the level 24 of its source of supply. By this method the flow or the number of drops per minute is controlled. This device may be used throughout this apparatus wherever it is desired to regulate the flow of liquid.

Figure 3:
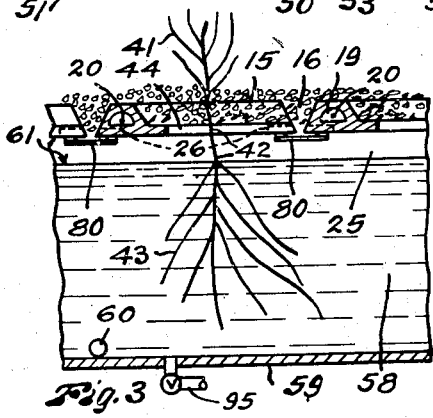
Fig. 3 is a fragmentary sectional view substantially on a broken line 3—3 of Fig. 2.
Figure 4:
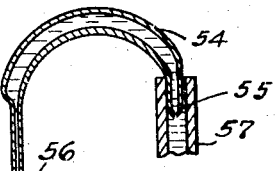
Fig. 4 is a detached fragmentary sectional view of an example of a controlled automatic metering device shown in Fig. 1.

In Fig. 3, 58 shows nutrient solution for water culture located in 59, a container or tank for a water culture nutrient solution.

60 shows a draw-off conduit by which the tank may be emptied.

61 shows a level above which the water culture nutrient solution must not come.

25 shows my evaporation-proof but oxygen-replenished barrier to net evaporation having humidity maintained just below the dew point by moisture and heat from a litter, and its heating means, said litter securing its moisture from liquid from a source independent of the liquid in the nutrient solution of such as the water culture 58.

In Fig. 5, 62 shows soil which contains such as the usual soil moisture or soil solution of plant nutrient.

Figure 2:
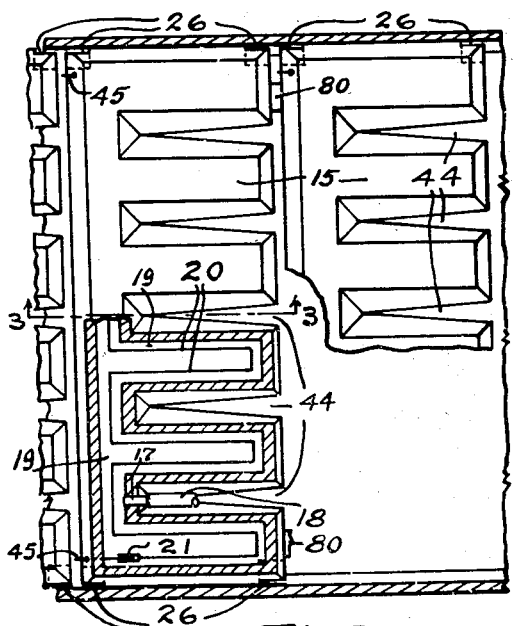
Fig. 2 is a plan view with parts in section showing an example of apparatus for carrying out water culture; showing of the black aggregate has been omitted.

63 shows longitudinal supports for a top litter such as 15 of Figs. 1, 2 and 3.

82 shows white aggregate over the litter 15, said white aggregate differs from the black aggregate essentially in color, and may be substituted anywhere for the black aggregate 16.

The application of this invention to soil culture is similar to the applications to aggregate and to water culture already described. A top litter is adapted to supply, from an independent source, moisture to the root crown, and moisture to the foliage, and is adapted to appropriately increase said supply of moisture in ratio with increments of artificial heat applied to the root crown, and applied as warm moist air to the foliage, and applied to the surface of the plant nutrient. In the event of a hot day said same top litter is also designed to originate a cool, moist atmosphere beneath the foliage of the plant, about the root crown of the plant and over the upper surface of the plant nutrient, and to secure the liquid for providing said moist atmosphere from a source independent of the liquid in the plant nutrient solution film on the soil media.

Soil moisture may be supplied by such as rain, irrigation, a lower litter, or by any other method for moistening soil.

All advantages discussed relative to the apparatus of Figs. 1, 2, 3, 6, 7, 9, 10, and 11 can be had by the apparatus of Fig. 5 in the instance where the soil already contains proper amounts of the chemical elements necessary to plant growth, except in the instance of altering the mineral uptake by the plant. The normal diet of plant food chemicals used in the early stages of the growth of the plant leaves ions, such as the nitrogen ion, in the soil which cannot be as conveniently removed to make the full change in plant food chemicals necessary during the latter or fruiting stage of the plant when multiplying selected desirable chemicals in its edible or other portions. Hence, in the instance of soil culture, inhibition of nitrogen assimilation is accomplished by resorts such as adding the chemicals which interfere with the assimilation of nitrogen, as potash, chlorine and others, or by maintaining a low temperature at the root crown (such as nature provides in autumn) or by turning off the heat source entirely, or to the use of alternate equipment beneath the litter such as shown in Figs. 1, 12 and 13.

In Figs. 6 and 7, 73 shows one element of a modified litter, said element comprising a rope, tube or wick-like shape formed from material such as glass, asbestos, plastic, or ramie fibres. 73 is optional and may be omitted.

74 shows another element of said modified litter. 74 comprises material such as a cloth of asbestos, glass, plastic, ramie or similar material supported over the nutrient solution by means such as 75, longitudinals of any suitable material detoxicated if necessary by painting with such as hot asphaltum.

76 shows braces at intervals to prevent too much bending of the longitudinals by the pull of a taut material.

77 shows a trough for supplying liquid to porous material such as 73 or 74.

20, a heating means may be located in any one or all three of 73, 74 and 77.

78 shows a level of liquid which may be maintained by means of apparatus such as shown by 22 and 23 in Fig. 1, or by a continuous flow of water.

Said modified litter of Figs. 6 and 7 may be substituted herein wherever a litter is useful. Said modified litter contributes all of the advantages cited anywhere herein for a litter, except easy removal by hand of plants whose roots or stems pass through said litter and become entangled in it.

80, in Figs. 2 and 3, shows detachable flexible connectors of non-toxic nature such as rubber or other plastic or such as chain coated with asphaltum. By means of these connectors a plurality of litters 15 may be attached to each other to form a conveyor over such as the simple water culture tank 59 of Fig. 3 or over a tank such as shown in Figs. 14 and 15 wherein tank 129 has different compartments containing different plant nutrients. By means of the conveyor the plants and the aggregate 16 can be pulled to a position beyond the end of such as the tank 59 or the tank 129, thereby avoiding spilling pieces of root or aggregate into said tanks. The plants and their roots can be easily slipped from their position in the slots 44 by hand or by automatic mechanical means since the slots 44 taper and have one end left open to facilitate removal of plants.

81 shows examples of shut off valves which may be located wherever useful herein.

82 shows white aggregate which may be substituted for the black aggregate 16 wherever it is desired to cool plant environment herein.

The purpose of the white aggregate is to prevent heat from solar radiation from being efficiently utilized in order that better cooling effect of the root crown can be had at any season of the year in simulating autumn conditions, wherein a plant is deliberately cooled thereby retarding nitrogen assimilation for the purpose of improving the fruit or edible portions. Other purposes are such as to keep down the temperature of the entire environment of a plant in a climate where intense sunshine and high temperature are expected.

84 shows a petcock in Fig. 1 for draining sediment from the mixing chamber 36.

In Fig. 8, 86 shows any suitable material such as aggregate, or instead such as the gravel, sand, or cinders already commonly in use in an orthodox gravel, sand or cinder culture installation, with some orthodox slop or flooding method such as periodic pumping, or 86 may be instead aggregate such as pumice or other aggregate mentioned elsewhere herein, securing plant nutrients through methods suggested elsewhere herein, or instead 86 may be soil or other nutrient carrying media located indoors or outdoors, or instead 86 may be any aggregate or material used in a tray or other support over a water culture tank.

87 shows a V shaped longitudinal support or container such as two wooden boards nailed together into said V shape, or such as metal or such as extruded plastic having a similar shape and semi-rigid nature.

88 shows the liquid level of a liquid supply in 87, said liquid level may be maintained constant by means such as a float valve of the type indicated by 23 in Fig. 1 or by such as a continuous flow from a suitable uniform discharge. Means such as either 73 or 74 or both communicate, wick-like, with said liquid supply in 87 and remain moist through capillary action.

In Fig. 3, 95 shows an inlet conduit for supplying liquid to receptable 59. Liquid in this receptable 59 is maintained substantially at a predetermined level 61 a short distance below the litter means. The liquid level 61 may be maintained by float controlled valve means similar to float controlled valve 23 shown in Fig. 1. If a nutrient solution including freshly mixed chemical ingredients is to be supplied to receptacle 59 then conduit 95 may communicate with mixing chamber 36.

In Fig. 1, 96 shows a separate compartment or separate container of such as soil, water culture solution or aggregate. There may be several of such containers each having 97, a lower litter, in the instance of aggregate culture. A fine mesh capillary material such as 31 may be used on or around litter 97. This fine mesh capillary material is not shown in connection with litter 97 in Fig. 1, but is shown in connection with litter 32.

98 is an example of a conduit carrying fluid to a part of the roots of a plant. Said fluid may come from another mixing chamber not shown in Fig. 1, but which is similar to chamber 36, and therethrough to another complete of partial set of mixing containers not shown in Fig. 1, but similar to containers 38, 39 and 40 therein shown, or 98 may lead from a float controlled nutrient solution source or from water or from a fluid supply of any plant food or stimulant which it may be desired to test in a laboratory or to feed in actual field production. 29 and 96 contain different roots of the same plant and different plant foods. Osmotic pressure in the roots of the plant will determine the amount of plant nutrient which a plant will take from either container 29 or 96. Relative sizes of 29 and 96 may be varied. Evaporation can take place from neither of these said containers because of 25, a barrier to evaporation. For these reasons, movement of liquid through different conduits such as conduits 35 and 98 will originate from movements on films on aggregate such as shown in 28 and 96. Said movement will take place because there have been movements in an unbroken column of liquid hanging from the capillary pores in the leaves of the plant itself. Erratic movement is said unbroken column because of transpiration originating in unsatisfactory foliage humidity is controlled by a litter material and heat source such as 15, 20 and litter material and heat source such as 48, 49, 50 or by other means providing appropriate humidity to the foliage. Thus necessarily, a movement in such as conduits 98 and 35 is because of processes such as respiration or metabolism in the plant itself.

Therefore, such as an academic investigator can place a very sensitive instrument for recording movements of liquid in conduits 35, and in 98 and in others not shown in Fig. 1 and said academic investigator can therewith discover many metrical facts concerning the results of various equilibriums of the various components of each factor of plant growth on the various components of the other factors of plant growth, namely such as the various stated components of each of such as the following 5 factors of plant growth:

1. Various concentrations of various gases to the foliage such as of the gas $CO_2$.
2. Various colors, wave lengths, frequencies and intensities of various lights, vibrations, emanations and radiations.
3. Various levels of moisture to the foliage, root crown and to the feeder roots.
4. Various plant nutrients and other chemicals in various concentrations, ratios, compounds and in various atomic relationships to each other.
5. Various temperatures to various parts of the plant or its environment.

Said metrical facts recorded and analyzed through the agency of pure science are faithfully duplicated in actual production in the field by the method and mechanical devices of this invention even in the hands of a field operator who has little or no understanding of the how or why, back of the rule of thumb method carried out.

Said results can be expressed in terms of total yield, quality of yield, inhibition or increase of specific vitamin content in yield, inhibition or increase of the uptake of individual chemical elements by the plant, inhibition or increase of the manufacture of specific amino acids by the plant or in other appropriate terms.

99 shows a strip of material such as wood which excludes direct sunlight.

100 shows a conduit leading to a water supply such as water mains.

In Fig. 9, 114 shows liquid from a source independent of the liquid from the plant nutrient solution. Any suitable source of liquid supply which is positioned preferably slightly above the elevation of the highest portion of the plant heating and moistening device, shown in Fig. 9, may be used.

215 and 315 illustrate valuable moisture diffusing means. An enclosure is shown formed by folded sheet material such as a closely woven fabric or such as a sheet plastic in each instance having pores sufficiently constricted in size to prevent the loss of free liquid through said pores. 215 and 315 form respectively 119 and 219, which show the enclosures formed by 215 and 315 respectively.

269 and 369 show where the head of liquid rises through 269 and 369, spacers of such as a coarser fabric or plastic having pores sufficiently large that free liquid may flow through said pores, and having preferably a resilient quality.

278 and 378 show jaws which clamp together the edges of 215, the edges of 315, the spacer 269 and the spacer 369 with sufficient pressure to prevent loss of free liquid outside the enclosures 215 and 315, from between said jaws, or from between the materials clamped therein.

278 illustrates the container for the supply of independent liquid 114. Said container 278 is formed from extruded plastic or from other suitable material having, preferably, semi-rigid characteristics.

In Fig. 10, 126 shows, at a point below the upper surface of 86, a longitudinal slit or opening and 226 shows, exposed through the surface of 86 a longitudinal slit or opening respectively in 187 and 287, conduits or containers for liquid having therein 114, liquid from a source independent of the liquid from the plant nutrient solution, and having therein a heating means comprised of such as hot water.

188 shows levels of liquid in 187 and 287.

Vapor from the heated independent liquid in 187 and 287 passes through the longitudinal slit or opening 126 and 226 in the non-porous container 187 and 287 and thence to 86 and 241. Even on a warm day the differences in temperature brought about by evaporation of moisture from root receiving means 86, cools said 86 sufficiently that said vapor passing through said opening 126 is condensed upon 86. Thereafter said moisture is distributed through 86 by capillary and cohesive forces.

The functioning of 287 is similar except that the warmed vapor is free to rise directly to the foliage 241 since the opening 226 is exposed.

The longitudinal slits 126 and 226 are much larger than capillary size but are sufficiently constricted in width that particles of 86, too large to be washed away in the conduits 187 and 287 are too large to pass through said slits in said conduits.

In Figs. 9 and 10, 120 shows the level within root receiving means 86 at which warmed moisture originates within 86.

20 shows a rubber soil heating cable as an example of a heating means.

In Figs. 8, 9 and 10 the heat from said heating means 20 originates within the nutrient medium near the upper surface of said nutrient medium and above the portion of said nutrient medium where 43 the feeder roots of the plants are concentrated.

Because of the positioning of heating means 20, several desirable functions are simultaneously performed. Heat from the heating means 20 is conducted to the portion of the plant nutrient medium where the feeder roots are concentrated and heat from the same heating means 20 is radiated to the root crown of the plant and in addition heat from the same heating means 20 passes by convection to the foliage. But in all three instances the usual drying out effect of artificial heat upon plants is avoided by enclosing the heating means 20 within a supply of independent liquid subject to evaporation such as shown by 114, and by blanketing the heated nutrient medium with evaporable moisture from liquid supply 114 having a source independent of the liquid in the plant nutrient.

The evaporation proof chamber 25 shown in Figs. 1, 3, 5, 7, 16, 18 and 19 is omitted in the apparatus of Figs. 8, 9 and 10 but much of the benefit obtained by the use of chamber 25 is retained by virtue of the positioning of 120, the level of origin of the warmed moisture with respect to the nutrient in the root zone of root receiving means 86.

Movement of liquid to the surface from the portion of the nutrient medium in which the feeder roots of the plants are concentrated is prevented by the superimposed independent moisture supply originating adjacent to the root crown at 120 and positioned just underneath the upper surface and therefore providing moisture positioned more available to evaporation.

The modified litters of Figs. 8, 9 and 10 in common with all other litters described herein, prevent the compensation of evaporation loss by the objectionable flow of nutrient carrying moisture away from the root zone and up to the surface where the nutrients are deposited by said flow in a location unavailable to the feeder roots and in toxic concentration, particularly in the instance where an underground liquid supply is substituted for the ever recurrent errors in surface watering made by even the most skilled attendant.

The modified litters of Figs. 8, 9 and 10 do not have the absolute efficiency of the litters providing the evaporation proof chamber but do retain the essential functions. Said litters of Figs. 8, 9 and 10 when formed of such as an extruded plastic conform easily to the most practical form of inexpensive mass production, and to the conservation of shipping and of warehousing space.

In Figs. 11, 12 and 13, 114 shows liquid from a source independent of the liquid from the plant nutrient solution.

115 shows examples of non-porous covers, in these instances shown over receptacle 59 which is also shown in Fig. 3 with a porous body similarly positioned.

25 shows a chamber receiving vapor from a liquid source independent of liquid in such as the water culture solution shown. Said chamber impounds said vapor over the plant nutrient and thereby prevents net loss of moisture from said plant nutrient without the use of any porous body whatsoever:

125 shows a chamber for receiving and impounding a flow of air which may be heated and which is maintained highly saturated with moisture from a source independent of the liquid from the plant nutrient solution. In the instance of 125 said flow of highly saturated air is maintained moist with the independent liquid and then supplied to said chamber through conduits from any suitable source. 125 therefore provides, from an independent source, moisture to the root crown and a barrier to net evaporation from such as the water culture solution illustrated, and accomplishes both of these objectives without requiring the use of any porous body whatsoever.

126 shows a hole through which the stem of a plant passes and in addition, in Fig. 11, warm moist air passes therethrough to the foliage from 122 which shows a double trough-like container open at the top, in Fig. 13, but, in the instance of Fig. 11, positioned underneath the cover 115 and said container having therein, in each instance 114, liquid from a source independent of the liquid in the nutrient solution, such as independent of the liquid in the water culture solution 58. The double trough-like container 122 rests upon container 59.

124 shows a suitable level for said independent liquid in container 122 which level is maintained by any suitable means. In the instance of Fig. 13 the double trough 122 substitutes for cover 115, of Figs. 11 and 12.

20, Figs. 11 and 13, shows an example of a heating means for warming said supply of independent liquid positioned underneath the foliage and thereby evaporating moisture to the foliage from an independent liquid supply without the use of any porous body whatsoever and in Fig. 11 simultaneously providing a highly saturated atmosphere impounded over the nutrient solution and thereby preventing net evaporation without the use of any porous body whatsoever.

In Figs. 14 and 15, 27 shows openings by which oxygen may reach the roots.

129 shows a container which may be substituted for container 29 of Fig. 1.

186, 286, 386 and 486 show materials adapted to receive the roots of a plant such as the materials enumerated earlier herein under 86 but each having, in the instance of nutrient carrying media, a different nutrient content suited to different stages in the growth of the plant.

194, 294, 394 and 494 show containers, each receiving different roots of the same plant.

197, 297, 397 and 497 show lower litters two or more of which (particularly in the instance where aggregate is used in the containers) have therein different nutrient solutions. Said lower litters each communciate through conduit 98 to 81, valves by means of which the flow from conduits 98 of such as water to the nutrient media or nutrient to the aggregate may be controlled.

By making container 129 endless, said container may be utilized as a conveyor for conveying plants through different greenhouses suited to different stages in the growth of said plants. By means of said valves 81, the nutrient supplied to said plants is adjusted to different stages in the growth of the plants. This conveyor is suited to aggregate culture and to soil culture. The conveyor illustrated in Figs. 16 and 17 is adapted to water culture.

No upper litter is shown in Figs. 14 and 15, but any of the upper litters illustrated elsewhere herein may be used.

In Figs. 16 and 17, 114 shows liquid from a source independent of the liquid from the plant nutrient solution.

133 shows a tunnel in litter 32 which tunnel serves as a receptacle and conduit for fluid. Said litter 32 and heating means 20 are adapted to provide an atmosphere for stimulating germination, root initiation and root growth.

143 shows the roots of a plant in the act of falling by gravity from the hole 144, in conveyor 174, through which the lower stem and roots of a plant may easily pass such as in natural growth or in transplanting or in removal of plants at the end of their period of usefulness.

148, 248, 348 and 448 each illustrate sections from different greenhouse walls which sections of walls are adapted to provide different humidity and heat conditions suited to progressively later stages in the growth of the plant.

159 shows a water culture container having therein a water culture solution the formula for which is determined, by means of apparatus such as shown in Fig. 1, or in Figs. 18 and 19; or by other means or methods, as suitable to a plant in an early stage of its growth.

259 shows a second water culture container having therein a different water culture solution having a formula arrived at by similar means or methods as suited to a later stage in the growth of the plant.

359 shows a third water culture container having therein another separate but similar water culture solution but suited to a still later stage of growth of the plant. 459 shows a fourth similar water culture.

170 illustrates a seedling.

171 shows a driving gear. Preferably said gear should provide variable speeds.

172 shows shafts.

174 shows a conveyor formed by a continuous belt of material such as the materials named herein under 74. Each edge of said 174 dips into the independent liquid supply 114 in the two troughs 77. By capillary attraction the conveyor therefore remains moist while between said two troughs 77.

274 is optional and shows material such as a piece of litter 174 upon which such as seeds may be placed by mechanical means not shown. 274 is placed upon 174 in such manner that its edges extend beyond and close the prearranged hole 144 in 174 as shown in Fig. 17. The roots of the seedling penetrate through 274 and may conveniently be passed through or removed from the prearranged hole 144 in 174 either by hand or by mechanical means. When it is desired to remove that plant from 174, 274 may also be removed and discarded, or instead removed and salvaged after having been disengaged from the plant by means such as through oxidization by fire or digestion by acid.

It is possible to dispense with the pieces of material 274. When this is done the holes in the litter member 174 are preferrably omitted and the plants germinated directly on litter 174. The roots of the plants then penetrate litter 174 to reach the plant nutrient solution located below said litter 174.

The plants are subsequently disengaged from 174 by fire, by chemical oxidization or by cutting while said 174 is returning beneath the series of different water culture tanks.

Materials for 74 named earlier herein were selected on the basis of being resistent to oxidizing or digesting agents which could be used to attack the plant where it passes through 174 or through 274.

175 shows pairs of rollers which turn upon the shafts 172. Said pairs of rollers support the conveyor 174 but permit the roots of the plant 43 to pass between the tips of each pair of rollers and permit the outer edges of 174 to dip into the troughs 77 as shown in Fig. 16.

43 shows plant roots which by means of driving gear 171 are drawn by the conveyor 174 through the different water culture tanks 159, 259, 359 and 459 containing the solutions suited to progressively later stages in the growth of the same plant.

41 shows plant foliage which by means of the driving gear 171 is drawn by the conveyor 174 through the different greenhouses, (illustrated by greenhouse sections 148, 248, 348 and 448) suited to progressively later stages in the growth of the plant, thereby automatically providing temperature and humidity adapted to progressively later stages in the growth of the same plant.

176 shows posts which support the automatic feeding apparatus, thereby providing a space for conveyor 174 to return underneath the series of different water culture tanks.

179 shows a compartment into which the seedling roots extend. This compartment is maintained by such as heat source 20 and litter 32 at a temperature, moisture, chemical and light condition suited to the growth of seedling roots.

195 shows an opening in container 159 to which the conduit 35 of Fig. 1 may be attached, thereby replenishing container 159 from mixing chamber 36 and therethrough from the plurality of different chemical solutions which react undesirably if mixed while concentrated and allowed to remain mixed for substantial periods of time. Similarly containers 259 and 359 are replenished through different mixing chambers leading to different nutrient solutions each solution being suited to a progressively later stage in the growth of the plant on the conveyor.

196, 296, 396, 496 and 596 shows inclines. Said inclines illustrate a means to assist the roots of the plant 43 from one greenhouse to the next and from one nutrient solution container to the next when said plant roots are being dragged by conveyor 174 from such as nutrient solution container 259 in greenhouse 159.

In Figs. 18 and 19, 229 shows a container which may be substituted for container 29 of Fig. 1.

182 shows a root establishing means such as sand. Said establishing means should preferably be inert and have very little capacity to transmit capillary liquid. The roots of a seedling or small plant will therefore establish themselves upon the nutrient supply at the capillary openings at the tips of conduits 98 instead of upon the establishing means 182.

185 shows a supporting standard for 190, the table upon which 182 rests. Preferably said table is constructed of non-reactive material such as glass.

697 shows the tips of conduits 98 restricted to capillary openings. When desirable the table 190 may be lowered away from the capillary openings 697 by means of supporting standard 185. Root establishing material 182 having very little capillary attraction will sift from among the roots 43 without injury to said roots.

199 illustrates stiffening means of such as hard rubber or plastic for supporting conduits or members which pass through the walls or bottom of container 229.

Any apparatus shown herein may be used in different combinations than those combinations shown.

Besides the examples of shapes shown herein for the carrying out of aggregate culture and for the carrying out of other culture, such various other shapes as may be found advisable or advantageous may be used in carrying out the objects of this invention.

All the figures herein illustrate valuable devices which introduce an automatic supply of moisture to a plant at a novel position with respect to the surface of the plant nutrient, to the feeder roots and to the root crown of the plant.

All the figures herein illustrate valuable devices which automatically apportion, to the root crown and to the foliage of a plant, moisture from a supply of liquid from a source independent of the liquid in the plant nutrient solution. In all the figures except Fig. 4 said apportioning devices in each instance automatically apportion more of said independent moisture when heat is applied.

All the figures herein illustrate valuable devices for protecting from uncontrolled changes in concentration the zone of the nutrient occupied by the feeder roots of a plant.

All the figures herein illustrate valuable control devices for academically deriving a schedule, which schedule includes mathematical evaluation of each optimum growth requisite entailed in the production of a biologically superior plant, and in addition all the said figures illustrate valuable control devices by means of which the details of said schedule can subsequently be reproduced by persons unskilled in the art of the growing of plants.

I claim:

1. In plant husbandry, apparatus for continuously feeding to a plant at a rate corresponding to a predetermined rate of assimilation by the plant a plurality of different chemical solutions which react undesirably if mixed and allowed to remain mixed for substantial periods of time, comprising a plurality of containers containing the respective chemical solutions, each container being of a cross sectional area proportional to the predetermined rate of assimilation by the plant on a liquid basis of the chemical solution in the container and portions of at least two of said containers being positioned at a common elevation and a common liquid level being maintained in said containers that are at a common elevation, porous body means in accessible relation to one or more roots of the plant, a common conduit connected with said porous body means, and branch conduits connecting the respective containers with said common conduit.

2. The method of producing food plants which comprises maintaining the root crown of the plant at a relatively high temperature and at a humidity below but near the dew point during the growing stages of the plant thereby stimulating nitrogen assimilation, and foliage growth during said growing stages; and maintaining said root crown at a lower temperature and at a humidity below but near the dew point during the fruiting stages of the plant thereby inhibiting nitrogen assimilation and stimulating assimilation of desirable food elements during said fruiting stages.

3. An apparatus for that type of plant husbandry wherein plants use plant nutrient which contains liquid, and use liquid from a source independent of the liquid from the plant nutrient and means containing said plant nutrient comprising a conduit having therein a continuously delivered supply of the independent liquid; a body spaced over the said plant nutrient and below the foliage of the plant and communicating with said conduit and continuously receiving said continuously delivered supply of independent liquid; and said body having pores which have restrictions of a dimension to arrest escape of liquid while fostering evaporation of vapor from said supply of independent liquid.

4. A heating apparatus, for that type of plant husbandry wherein plants use plant nutrient which contains liquid, comprising liquid from a source independent of the liquid from the plant nutrient; a conduit adapted to have therein a continuously delivered supply of the independent liquid; an artificial heating means adapted to warm said independent liquid; a body spaced over the said plant nutrient and below the foliage of the plant and communicating with said conduit and continuously receiving over the plant nutrient said continuously delivered supply of warmed independent liquid; and said body having pores having restrictions of a dimension to arrest the escape of free liquid while fostering evaporation of vapor from the same supply of independent liquid.

5. A heating apparatus for that type of plant husbandry wherein plants use plant nutrient which contains liquid, means containing said plant nutrient and wherein plants use liquid from a source independent of the liquid from the plant nutrient comprising a conduit having therein a continuously delivered supply of the independent liquid; an artificial heating means adapted to warm said independent liquid; a body spaced over the said plant nutrient and below the foliage of the plant and communicating with said conduit and continuously receiving over the said plant nutrient said continuously delivered supply of warmed independent liquid; said body having pores which have restrictions of a dimension to arrest the escape of liquid while fostering evaporation of vapor from the same said supply of warmed independent liquid; and an air chamber provided over the said plant nutrient between the lower surface of said body and the upper surface of said plant nutrient, whereby vapor from said body is received in said chamber.

6. A heating apparatus for a type of plant husbandry which plant husbandry includes the use of plant nutrient which contains moisture subject to evaporation, means containing said plant nutrient, and liquid from a source independent of the moisture from the plant nutrient comprising a conduit having therein a continuously delivered supply of the independent liquid; artificial heating means adapted to warm said independent liquid; a body disposed in contact with the means containing the said plant nutrient and communicating with said conduit and receiving said supply of warmed independent liquid; and said body having pores which have restrictions of a dimension to arrest the escape of free liquid while fostering movement of capillary liquid through said pores, whereby moisture loss from the plant nutrient is replaced with the capillary liquid from the continuously received supply of the warmed independent liquid.

7. An apparatus for plant husbandry comprising a receptacle and plant nutrient which contains liquid occupying a portion of the receptacle; a source of liquid independent of the liquid from the plant nutrient; a conduit having a continuously delivered flow of said independent liquid therein; a plurality of bodies spaced over the said plant nutrient and below the foliage of the plant said bodies communicating with said conduit and continuously receiving said continuously delivered flow and said bodies preventing direct confluence of either liquid with the other; means connecting two or more of said plurality of bodies; and a conveyor, operable over the said plant nutrient, formed by said plurality of connected bodies.

8. An apparatus for plant husbandry comprising a receptacle and plant nutrient which contains liquid occupying a portion of the receptacle; a source of liquid independent of the liquid from the plant nutrient; a conduit having a continuously delivered flow of said independent liquid therein; a plurality of bodies spaced over the said plant nutrient and below the foliage of the plant said bodies communicating with said conduit and continuously receiving said continuously delivered flow and said bodies preventing direct confluence of either liquid with the other; means connecting two or more of said plurality of bodies; a conveyor operable over the said plant nutrient formed by said plurality of connected bodies; and tapering plant receiving slot means extending convergently from the edge of one or more of the bodies inwardly.

9. An apparatus for plant husbandry comprising a receptacle receiving some roots of the plant; another receptacle receiving other roots of the same plant; and means for supplying a different plant nutrient solution to each of said receptacles.

10. An apparatus for plant husbandry comprising a receptacle receiving some roots of the plant; another receptacle receiving other roots of the same plant; means for supplying a different plant nutrient solution to each of the said receptacles; and a means for measuring uptake by the plant from one or more of the different nutrient solutions.

11. An apparatus for plant husbandry comprising a plurality of receptacles receiving different roots of the same plant; means for supplying different plant nutrient solutions to each of said receptacles; another receptacle positioned over the said plurality of receptacles and below the foliage of the plant and shielding from exposure said different solutions in the said plurality of receptacles; and a means for supplying liquid to the said receptacle shielding said plurality of receptacles.

12. In that type of plant husbandry wherein a plant uses nutrient in fluid solution, the method of supplying liquid to a plant which comprises continuously delivering over the plant nutrient solution and underneath the foliage of the plant, a supply of liquid from a source independent of the liquid from the plant nutrient solution; preventing direct confluence of the independent liquid with the liquid in the plant nutrient solution; and exposing said independent liquid to evaporation.

13. In that type of plant husbandry wherein a plant uses nutrient in liquid solution, the method of supplying liquid to a plant which comprises continuously delivering accessible to the plant a supply of liquid from a source independent of the liquid from the plant nutrient solution; preventing direct confluence of said independent liquid and the liquid in the plant nutrient solution; enclosing the lower stem and root crown to the exclusion of the foliage; and shielding the plant nutrient solution from exposure to evaporation.

14. In that type of plant husbandry wherein a plant uses nutrient in liquid solution, the method of supplying moisture to a plant which comprises enclosing a portion of the plant by enclosing the lower stem and root crown to the exclusion of the foliage; delivering to the enclosed portion of the plant a supply of moisture from liquid from a source independent of the liquid from the plant nutrient solution; preventing direct confluence of the independent liquid and the liquid in the plant nutrient solution; and artificially maintaining said supply of independent liquid at a higher temperature than the liquid in the plant nutrient solution whereby the higher temperature of the independent liquid renders it more amenable to evaporation.

15. In that type of plant husbandry which includes the use of capillary liquid in plant nutrient medium, the method of supplying moisture accessible to a plant which comprises continuously delivering below the upper surface of the nutrient medium and above the main concentration of the plant roots a capillary transfusion of liquid from a source independent of the liquid from the plant nutrient; and exposing to evaporation liquid from said capillary transfusion of independent liquid which was delivered at said location, thereby forestalling movement of nutrient solution to the surface of the nutrient media.

16. In plant husbandry, the method of preventing compensation of evaporation loss by movement of moisture from the portion of a nutrient medium in which plant roots are concentrated which comprises continuously delivering below the upper surface of the nutrient medium and above the main concentration of the plant roots a capillary transfusion of liquid from a source independent of the liquid from the nutrient; and exposing to evaporation liquid from the capillary transfusion of independent liquid which was delivered at said location.

17. In that type of plant husbandry which includes the use of capillary liquid in a plant nutrient medium, the method of supplying moisture to plant foliage which comprises continuously delivering below the upper surface of the nutrient medium and above the main concentration of the plant roots a capillary transfusion of liquid from a source independent of the liquid from the nutrient medium; subjecting to artificial heat the nutrient medium receiving said capillary transfusion; exposing to evaporation beneath the foliage warmed liquid from the capillary transfusion which was delivered at said location; and moistening the foliage with a rising column of warmed air moistened with liquid from said capillary transfusion of independent liquid.

18. An apparatus for that type of plant husbandry wherein plants use plant nutrient solution, moisture from liquid from a source independent of the liquid from the plant nutrient solution and means containing said plant nutrient comprising a conduit having therein a supply of the moisture from the independent liquid; a body placed over the said plant nutrient and below the foliage of the plant and communicating with said conduit and receiving said supply of moisture from said independent liquid, and said body having pores which have restrictions of a dimension to arrest escape of liquid while fostering evaporation of vapor from said supply of independent liquid.

19. A heating apparatus, for that type of plant husbandry wherein plants use plant nutrient solution, comprising liquid from a source independent of the liquid from the plant nutrient solution; a conduit adapted to have therein a continuously delivered supply of the independent liquid; an artificial heating means adapted to warm said independent liquid; a body placed over the said plant nutrient and below the foliage of the plant and communicating with said conduit and continuously receiving over the plant nutrient said continuously delivered supply of warmed independent liquid; and said body having pores having restrictions of a dimension to arrest the escape of liquid while fostering evaporation of vapor from the supply of independent liquid.

20. A heating apparatus for that type of plant husbandry wherein plants use plant nutrient solution, means containing said plant nutrient solution and wherein plants use liquid from a source independent of the liquid from the plant nutrient comprising a conduit having therein a continuously delivered supply of the independent liquid; an artificial heating means adapted to warm said independent liquid; a body placed over the said plant nutrient and below the foliage of the plant and communicating with said conduit and continuously receiving over the said plant nutrient said continuously delivered supply of warmed independent liquid; said body having pores which have restrictions of a dimension to arrest the escape of liquid while fostering evaporation of vapor from the same said supply of warmed independent liquid; and an air chamber provided over the said plant nutrient between a lower surface of said body and the upper surface of said plant nutrient, whereby vapor from said body is received in said chamber.

21. An apparatus for plant husbandry comprising a receptacle receiving some roots of the plant; another receptacle receiving other roots of the same plant; means for supplying a different plant nutrient solution to each of said receptacles; a body placed over the plant nutrient and below the foliage of the plant and a conveyor, operable over the said plant nutrient, formed by said body.

22. In plant husbandry, apparatus for continuously feeding to a plant at a rate corresponding to a predetermined rate of assimilation by the plant a plurality of different chemical solutions which react undesirably if mixed and allowed to remain mixed for substantial periods of time, comprising a plurality of containers containing the respective chemical solutions each container being of a cross sectional area proportional to the predetermined rate of assimilation by the plant on a liquid basis of the chemical solution in the container and portions of at least two of said containers being positioned at a common elevation; a receptacle receiving one or more roots of the plant, a common conduit connected with said receptacle receiving plant roots and branch conduits connecting the respective containers with said common conduit.

NELSON B. ARMSTRONG.

REFERENCES CITED

The following references are of record in the file of this patent:

UNITED STATES PATENTS

| Number | Name | Date |
|---|---|---|
| 1,793,626 | McCormick | Feb. 24, 1931 |
| 2,431,890 | Raines | Dec. 2, 1947 |